J. A. BOW, P. THILL & A. E. WHEELER.
GRATE MECHANISM.
APPLICATION FILED DEC. 17, 1914.

1,191,272.

Patented July 18, 1916.
7 SHEETS—SHEET 1.

WITNESSES:
Harry A. Benner
Jasamichy

INVENTORS.
James A. Bow,
Peter Thill
Archer E. Wheeler.
BY
Emil Starck
ATTORNEY.

J. A. BOW, P. THILL & A. E. WHEELER.
GRATE MECHANISM.
APPLICATION FILED DEC. 17, 1914.

1,191,272.

Patented July 18, 1916.
7 SHEETS—SHEET 2.

FIG. 2.

WITNESSES:

INVENTORS.
James A. Bow,
Peter Thill, and
Archer E. Wheeler.

BY

ATTORNEY.

UNITED STATES PATENT OFFICE.

JAMES A. BOW AND PETER THILL, OF GREAT FALLS, MONTANA, AND ARCHER E. WHEELER, OF LONDON, ENGLAND.

GRATE MECHANISM.

1,191,272.   Specification of Letters Patent.   Patented July 18, 1916.

Application filed December 17, 1914. Serial No. 877,708.

*To all whom it may concern:*

Be it known that we, JAMES A. BOW, PETER THILL, and ARCHER E. WHEELER, citizens of the United States, the said JAMES A. Bow and PETER THILL residing at Great Falls, in the county of Cascade, State of Montana, and the said ARCHER E. WHEELER residing in London, England, have invented certain new and useful Improvements in Grate Mechanisms, of which the following is a full, clear, and exact description, reference being had to the accompanying drawings, forming a part hereof.

Our invention has relation to improvements in grate mechanisms; and it consists in the novel features of construction more fully set forth in the specification and pointed out in the claims.

The present invention is specially directed to grate mechanisms for gas producers and deep-bed fire boxes generally, or where there is a considerable depth of ashes separating the grates from the combustion zone or bed of red hot coal or equivalent fuel. The invention however is not restricted in its application to deep-bed fire boxes but may be applied to "direct firing", that is to say, fire-boxes in which there is a shallow bed, with the live coal resting on, and in direct contact with, the grates.

The objects sought by the invention are (1) to provide means for mechanically discharging the ashes, and clinkers, from the bed; (2) to discharge the same either intermittently or continuously and at a uniform rate; (3) to discharge them either uniformly and equally from all parts of the bed, or from one or more sections of the bed at a time, as desired; (4) to keep the bed of ashes uniformly agitated to the desired degree; (5) to remove clinkers positively and gradually without undue disturbance of the upper portions of the bed at any one point; (6) to dispense with the necessity of employing undergrate steam; (7) to prevent the formation of "blow holes" which, as well known, are the chief cause of clinker production; (8) to effectively break up, and remove such clinkers as may form, along with the ashes proper; (9) to reduce to a minimum the tendency to clinker formation; (10) to provide means for an even and uniform distribution of air through the bed and over the entire area thereof, thus obviating the necessity of the air being at a high pressure at any point in the bed, such as is the case with the use of the ordinary injection blower; and (11) to provide further and other features of construction the advantages of which will be fully apparent from a detailed description of the invention in connection with the accompanying drawings, in which—

Fig. 5 is an enlarged longitudinal vertical section on the zig-zag line 5—5 of Fig. 2; Fig. 8 is an elevation of the chain and tackle by which periodic rotation may be imparted to the cam-shafts, parts being broken, and other parts in section on the line 8—8 of Fig. 7; Fig. 9 is a transverse vertical sectional detail through a grate roll and spindle of the pawl, showing a portion of the cam-shaft in elevation; Fig. 9$^a$ is an end view of the spindle carrying the coiled spring controlling the lever connected to the pawl which actuates the ratchet wheel on the roll; Fig. 10 is a view at right angles to Fig. 9 looking toward the left of said figure, with parts in section; Fig. 11 is a diagrammatic end projection of one of the cam-shafts showing the circularly or circumferentially progressive disposition of the cams on said shaft; Fig. 11$^a$ is a longitudinal diagrammatic view of one of the cam-shafts showing the longitudinal and circumferential disposition of the cams along and around the shaft.

Figure 1:
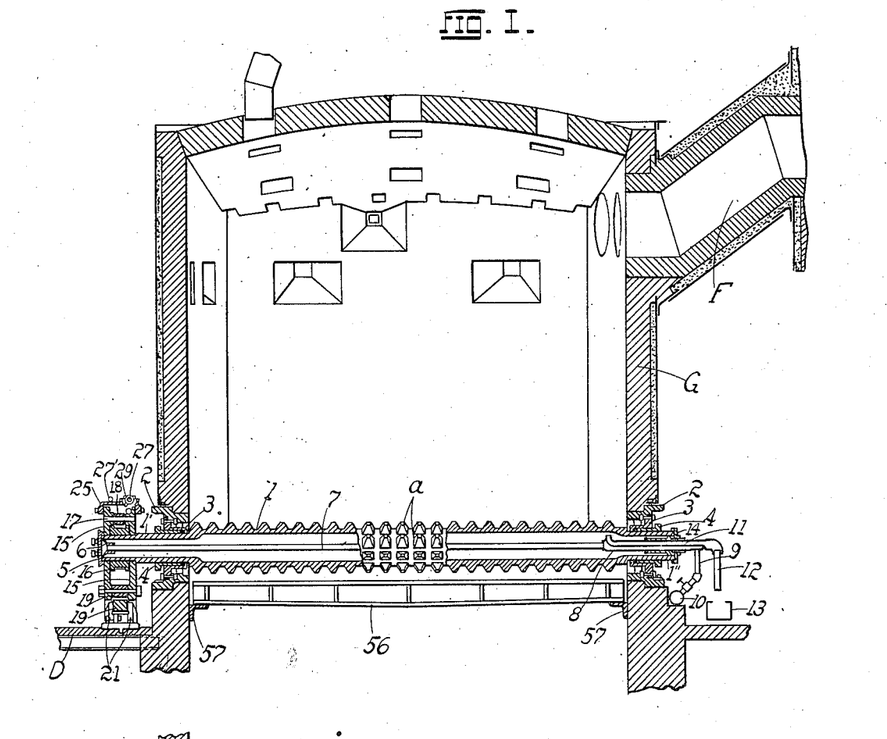
Figure 1 is a vertical transverse section of a conventional gas producer showing our invention applied thereto.
Figure 2:
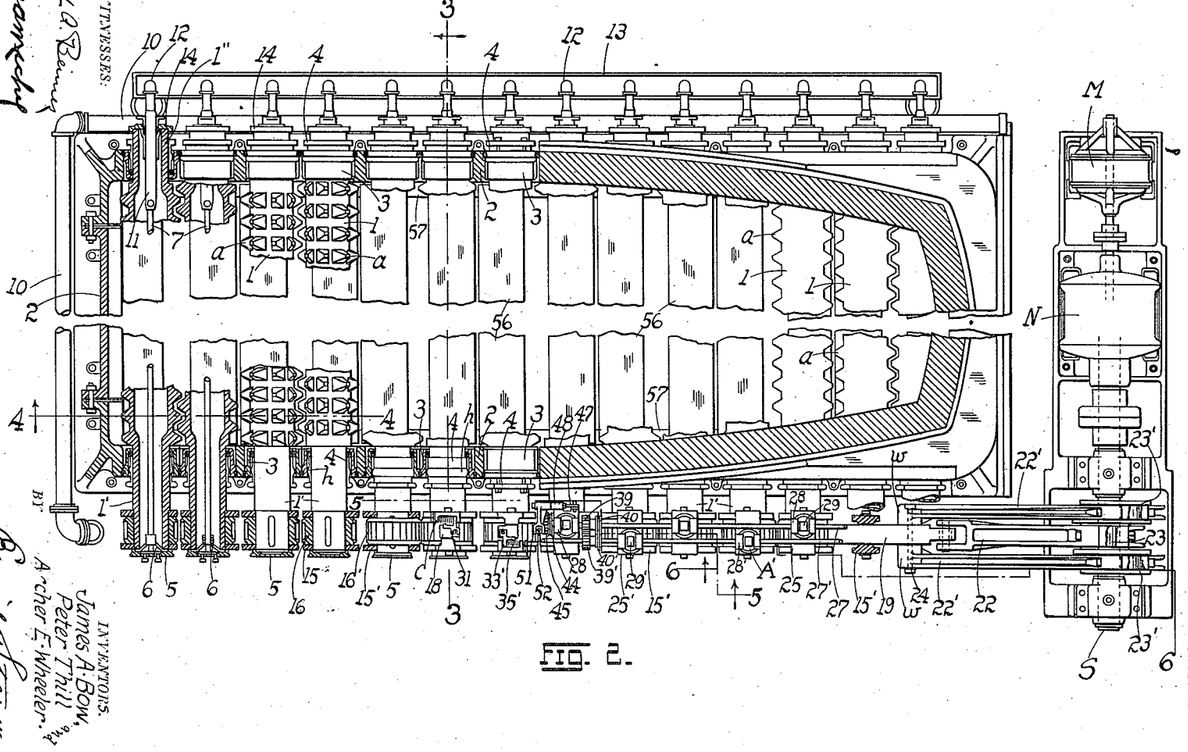
Fig. 2 is a top plan of the grate mechanism with parts thereof broken away, and showing portions of the producer walls in section.
Figure 3:
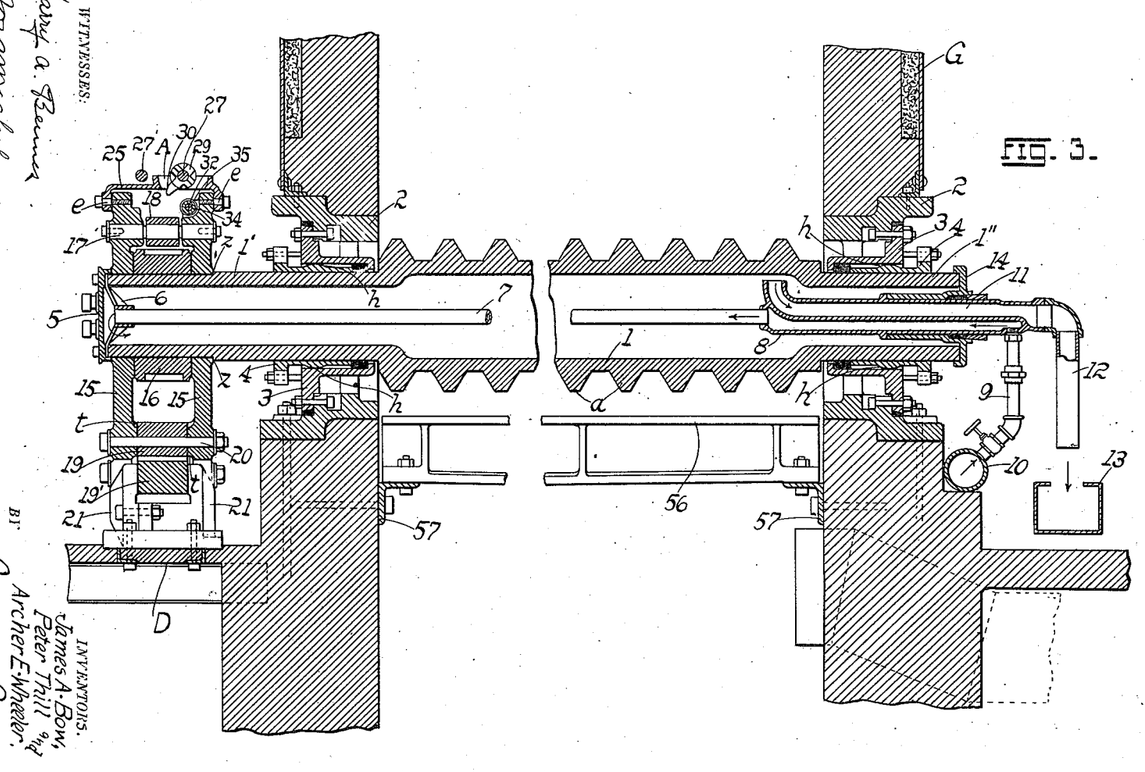
Fig. 3 is an enlarged vertical cross-section on the line 3—3 of Fig. 2.
Figure 4:
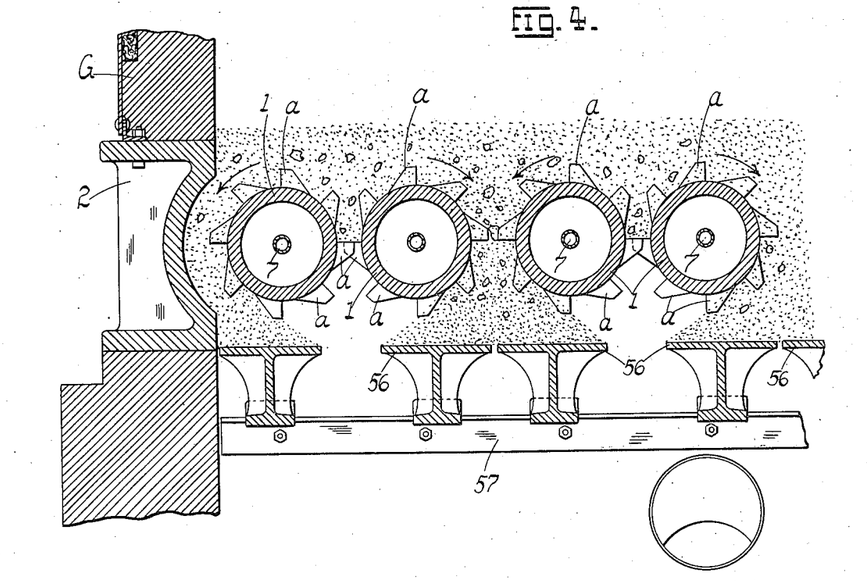
Fig. 4 is an enlarged longitudinal vertical section on the line 4—4 of Fig. 2.
Figures 5, 11A:
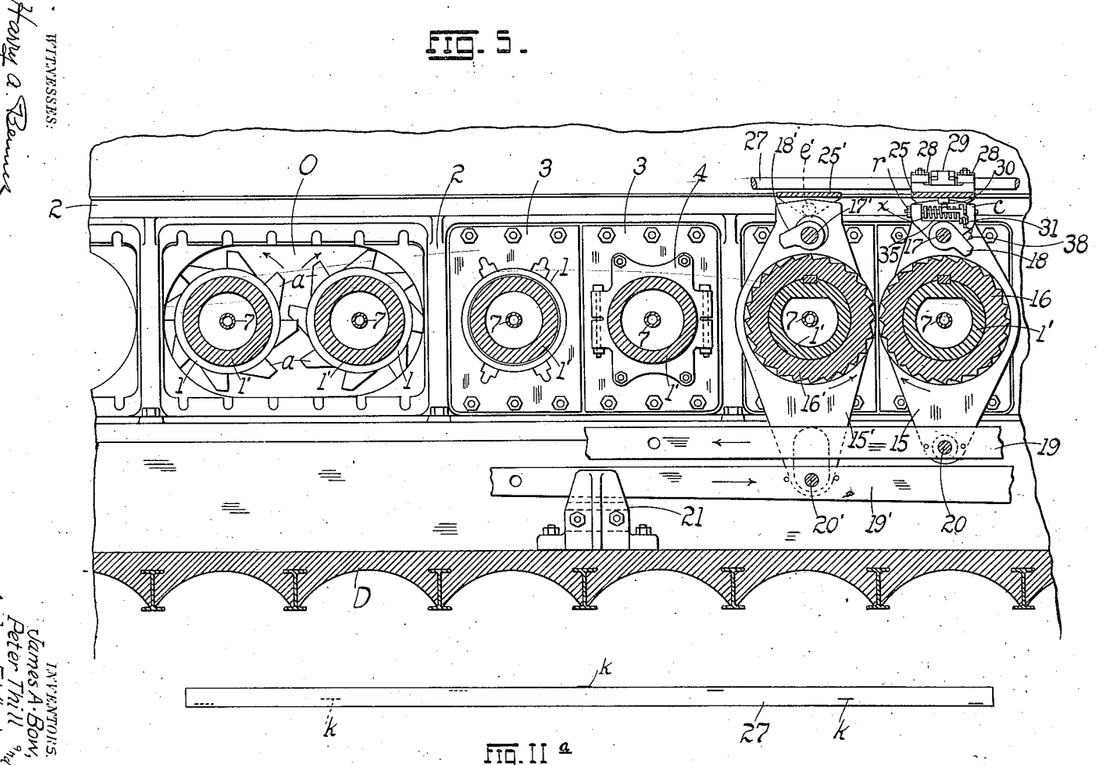

Referring to the drawings, and for the present to Figs. 1 to 12 inclusive, G represents a conventional gas producer provided with an outlet gas-flue F discharging directly (if desired) into a furnace, fire pot or other chamber (not shown) for burning the producer gas, as well understood in the art. In the present embodiment of our invention, the grate elements, which in the illustrations are in the form of hollow grate-rolls or cylinders 1, 1, are disposed in pairs across the bottom of the gas-producer chamber (or fire-box where applied to fire-boxes) the axes of the elements composing any given pair being spaced farther apart than the axes of the contiguous elements of adjacent pairs (Figs. 4, 5,) said spacing being necessitated by reason of the direction of rotation imparted to the elements or rolls of any pair as will more fully hereinafter appear. The peripheral surfaces of the grate rolls may be smooth, though preferably, and in the majority of cases necessarily, they are provided with radial projections or protuberances $a$ over the grate area proper, or that portion within the chamber of the producer (or fire-box), the projections on one roll alternating or staggering with the corresponding projections on the rolls on either side thereof, that is to say the projections of successive rolls are out of alinement. It must be understood in this connection that the projections $a$ are only by way of example, and that we do not desire to restrict ourselves to this form of projection as any other suitable formation serving a similar or equivalent purpose may be availed of. Among these may be mentioned (without illustration) longitudinal or helical ribs, extending continuously, or isolated masses suitably disposed over the surface of the roll. They may be cast integral with the roll or attached thereto. Neither are we to be understood as restricting ourselves to rolls circular in cross-section, any other form of cross-section being contemplated by our invention. In the present illustration the rolls or grate elements are shown hollow, but a solid roll is likewise contemplated by our invention and in many instances will serve its purpose as well as a hollow roll. Each roll terminates in reduced trunnion portions or extensions 1', 1", respectively, the trunnion 1' being the longer of the two (Fig. 3). The means for supporting the rolls is substantially as follows: Carried by the opposite walls of the producer between which the rolls are disposed are metallic frames 2 provided with a series of openings O, each opening being traversed by the trunnions of contiguous rolls of adjacent pairs (of rolls) as above described, the border of each opening being suitably recessed to receive the flanged portion of the stuffing boxes 3 bolted to the frame, each box in turn receiving the gland or follower 4 bolted to the member 3 as well understood in the art, the periphery of the tubular portion of the gland having formed thereon an annular spherically contoured rib or bearing $h$, the curvature of the bearing causing the gland to aline itself to the axis of the roll without requiring an accurate lining up of the frame (Fig. 3). The stuffing-boxes 3 are preferably made of two independent sections, that is to say, one stuffing-box for each trunnion, whereby upon removal thereof from the frame 2, either roll, by a proper manipulation thereof, may be removed without materially disturbing the adjacent roll (Fig. 5). The roll extension 1' is closed by a flanged cap-piece or plate 5, between which and the terminal edge of the extension is secured a conical spider 6, the hub portion of which supports the discharge end of a water-circulating pipe 7, the opposite or intake end whereof is coupled to a hollow cylindrical member or casing 8, the intake end of which terminates at a point beyond the walls of the producer, being tapped by a valve-controlled pipe or branch 9 which takes its supply from a pipe 10 disposed around the producer, the pipe receiving the circulating medium from any suitable source of supply (not shown). The water after circulating through the hollow grate escapes through the discharge conduit 11 of the casing 8, the outer end of the conduit having coupled thereto a branch 12 discharging into a launder 13 as shown (Fig. 3). The casing 8 passes through a conventional stuffing box 14 to prevent leakage.

Figure 6:
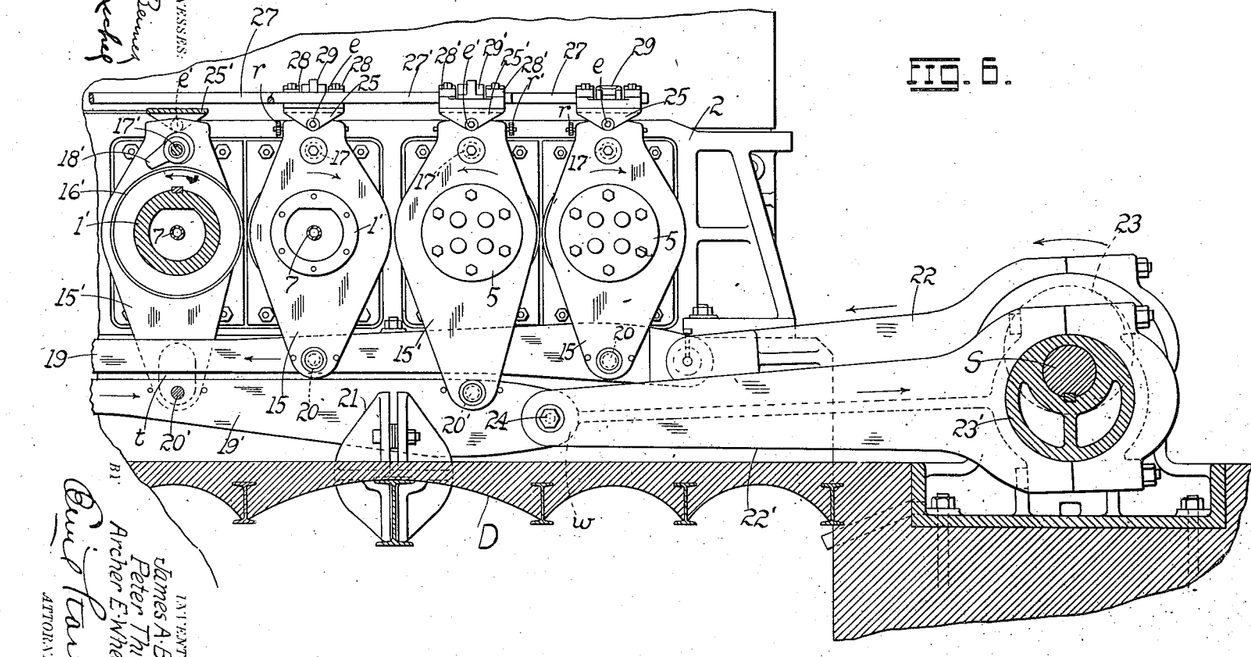
Fig. 6 is an enlarged longitudinal vertical section on the zig-zag line 6—6 of Fig. 2.

Mounted loosely and rotatably about the roll extension 1', between the plate 5 and an annular shoulder $z$ (Fig. 3), on the member 1', are a pair of rocker members 15, 15, (the adjacent member of each pair of rolls having similar rocker members 15', 15', somewhat longer than the members 15, 15, and extending below the same, but in other respects identical with the shorter members 15, 15, Fig. 6), the rockers being maintained a fixed distance apart by a ratchet disk or wheel 16 keyed or otherwise secured to the grate roll. The members 15, 15, (15', 15',) are free to rock (or oscillate about the axis of the grate roll) as a unit, their upper portions being connected by a cylindrical pin or spindle 17 about which is loosely mounted between the rockers, a gravity pawl 18 for engaging the teeth of the ratchet 16, the lower portions (or arms) of the rockers 15, 15, receiving between them a reciprocating link, connecting rod, or bar 19 which is pivotally coupled thereto by a cylindrical pin 20, the lower ends of the rockers 15', 15', receiving between them a corresponding reciprocating link or bar 19' connected pivotally to the rockers by a cylindrical pin 20', the bottom bar 19' being guided between brackets 21 bolted to the foundation D (Figs. 3, 5,). The lower arms of the rockers 15' are of sufficient length to span the link 19, the bosses t thereof engaging opposing faces of both links 19, 19', as shown in the drawings. The forward end of the link 19 is coupled to a single eccentric rod 22 the eccentric strap of which couples to an eccentric 23 keyed to the shaft S, the latter having rotation imparted thereto from a motor M operating through a speed reducer N well understood in the art. The front end of the link 19' on the other hand is pivotally coupled by a cylindrical bolt or pin 24 between the bosses w, w, of a pair of eccentric rods 22' whose straps are coupled to the eccentrics 23' set on the shaft S, on opposite sides of the eccentric 23, one hundred and eighty degrees apart from said eccentric 23.

Figures 8, 9, 9A, 10, 11:
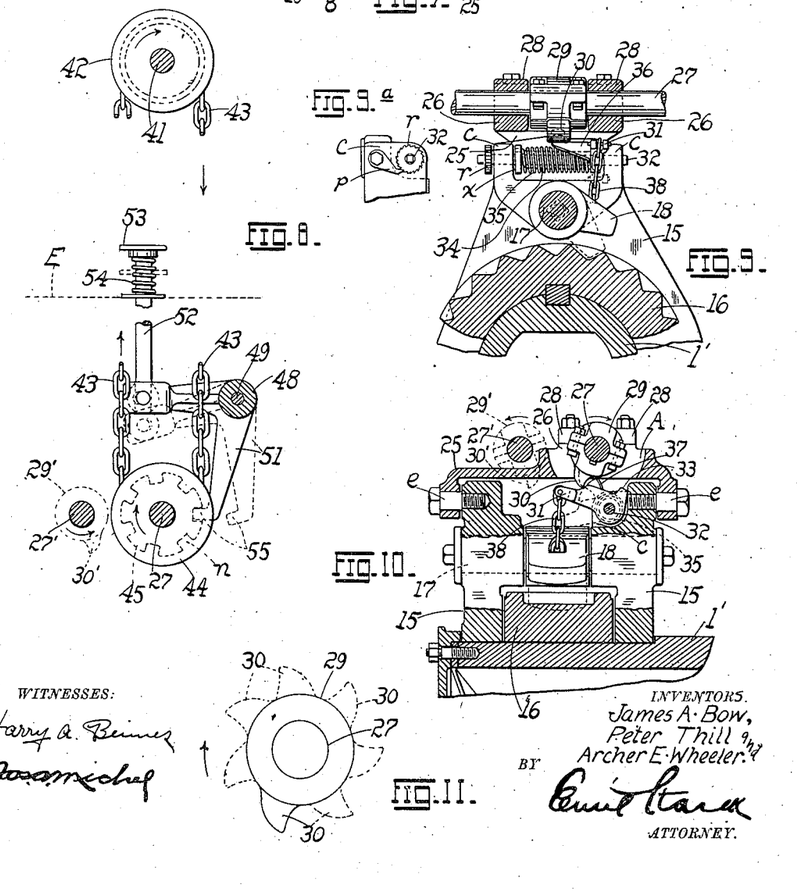
Figure 12:
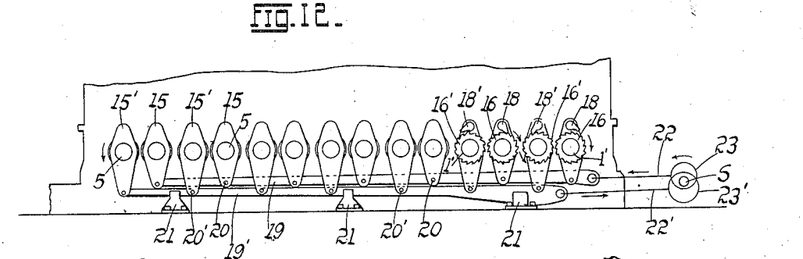
Fig. 12 is a diagrammatic elevation of the rocker members and reciprocating operating links therefor and some of the parts appurtenant thereto.

From the foregoing connections it must be apparent that rotation of the shaft S will impart reciprocations to the links 19, 19', simultaneously in opposite directions, and consequently will rock the members 15, 15', simultaneously in opposite directions. Similarly between the rockers 15' 15', there is disposed a ratchet 16' actuated by a pawl 18' hinged about a spindle or pin 17' connecting the members of each pair of rockers 15' 15'. Hinged to the upper ends of each pair of rockers 15, 15, and spanning said rockers is an inverted U-shaped yoke 25, the depending ends whereof are pivotally secured by screw-bolts e to the respective rockers, a similar yoke 25' spanning, and being pivotally secured to each pair of rockers 15', by pins e'. The top of each yoke 25 is formed with a dished cavity or opening A, bounded by bearings 26, 26, which support a combined rotary and longitudinally reciprocating shaft 27, suitable cap-plates 28 bolted to the bearings, holding the shaft in place on its bearings. In the same manner the top of each yoke 25' is provided with a dished opening A' spanned by a parallel combined rotary and longitudinally reciprocating shaft 27' resting in bearings to which are bolted cap plates 28'. Between the bearings 26, 26, directly over the opening A, there is clamped or bolted to the shaft 27, a sectional collar or ring 29, the bottom or under section being provided with a cam 30, (Fig. 10) freely rotatable in the dished opening A, said cam operating to depress (as presently to be described) the long arm 31 of a bell-crank mounted to oscillate about a pin or spindle 32 supported between the lobes or lugs c, c, formed on one of the rockers 15 of each pair, the short arm 33 of the bell-crank arresting the oscillations of the latter upwardly by striking the upper end of the inner curved face of the wall of the rocker adjacent to which the bell-crank is mounted. To secure a good bearing about the spindle 32, the bell-crank is preferably provided with a sleeve 34 loosely enveloping the spindle, there being coiled about the sleeve a spring 35, one end of which is secured to the lever 31 at the base of the sleeve 34, the opposite end being fastened to the collar x on the spindle, the latter being maintained against rotation by a pawl p (Fig. 9$^a$) engaging a ratchet r at one end of the spindle, this arrangement likewise serving as a means for adjusting the tension of the spring, the operator giving the spindle a turn or two by applying a wrench or similar tool to the square end of the spindle outside the ratchet r, the pawl preventing a return movement as well understood in the art. The lever arm 31 is provided with a laterally projecting member or bracket 36 the free end of which carries a hump or protuberance 37 directly in the path of rotation of the cam 30.

It will be readily seen (Fig. 10) that with a rotation of the shaft 27 clockwise, the nose of the cam 30 riding over the hump 37 will depress the same and the lever-arm 31, holding the same depressed as long as the nose of the cam 30 is maintained in engagement with the hump 37. The free forked end of the arm 31 has secured thereto the upper end of a chain or cord 38, the lower end of the chain being secured to the gravity pawl 18. It follows therefore that with a depression of the lever 31, the chain 38 will allow the pawl to drop and engage with the teeth of its ratchet 16. When the cam 30 has been rotated out of engagement with the hump 37, the spring 35 (which is always under tension) will obviously raise the lever-arm 31 to its original or raised position, the arm exerting a draft on the chain 38 and hence lifting the pawl 18 out of engagement with the ratchet 16. The shaft 27' is provided with a collar or ring 29' and a pawl 30' above the opening A'; the rockers 15' with a bell-crank lever 31', mounted about a spindle 32' with its collar x' supported between lugs c', c', on one of the rockers 15', said lever being provided with a short arm 33', a sleeve 34', a spring 35', a bracket 36' with a hump 37', a chain 38' leading from the lever arm 31' to the pawl 18', and the spindle 32' controlled by a pawl p' and a ratchet r' all identically the same as the corresponding parts identified with the shaft 27 and rockers 15.

Figure 7:
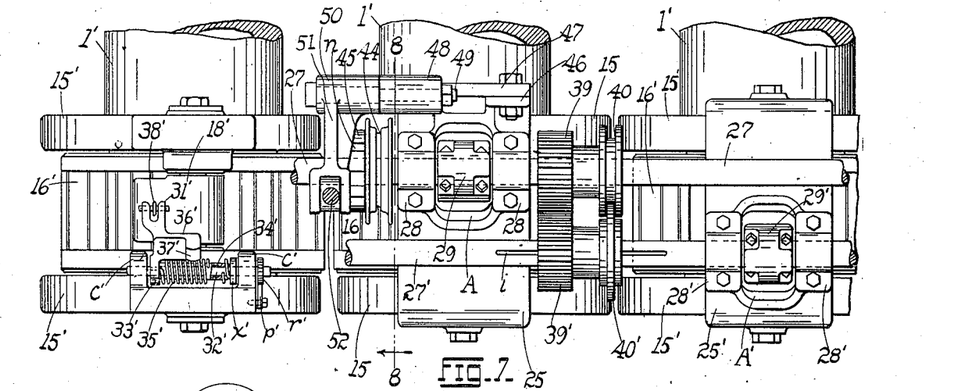
Fig. 7 is an enlarged top plan of the terminals of three grate cylinders or rolls and their supporting bearings, showing also the reciprocating cam-shafts, the rockers carrying the pawls controlled by the cams, and the ratchet disks engaged by the pawls, parts being in section.

Rotation is imparted to the shafts 27, 27', simultaneously in opposite directions (the shaft 27 rotating clockwise) through the instrumentality of the gears 39, 39', the gear 39 being fixed to the shaft 27 and the gear 39' being slidingly feathered to the shaft 27', the feather-groove being represented by $i$ in Fig. 7. The hub of the gear 39 terminates in a peripherally grooved collar 40, the groove receiving the annular flange 40' of the similar hub of the gear 39'. The flange 40' thus locking with the groove of the grooved collar 40 prevents longitudinal displacement of the gear 39', the two gears (39, 39') remaining permanently in mesh while the shaft 27' is free to reciprocate longitudinally through the gear 39'. These longitudinal reciprocations of the shafts 27, 27', result from the oscillations of the rockers 15, 15, 15', 15', the former reciprocating the shaft 27 in one direction, while the rockers 15', 15', reciprocate the shaft 27' in the opposite direction; and it is obvious that if during the opposite reciprocations of the cam-shafts (27, 27',) the gears 39, 39', are to remain in mesh, the shaft of one of the gears must be free to play through said gear. It is for this reason that the gear 39' is slidingly feathered to the shaft 27'. The rocking of the members 15, 15', obviously necessitates a hinged or swiveled connection between said members and the yokes 25, 25', in order to permit the shafts 27, 27', to maintain their horizontality; a rigid connection between the rockers (15, 15') and their yokes (25, 25') would obviously be out of the question. Since the shafts 27, 27', are geared together, it follows that if we rotate one of the shafts in a given direction, rotation will be imparted to the other shaft in the opposite direction. In the present illustration the shaft 27 is the drive shaft, that is to say it is directly connected to the mechanism by which rotation is imparted to the shafts, said mechanism being best illustrated in Figs. 7 and 8. At a convenient point overhead, and above the floor E below which the producer is installed, is a shaft 41 on which is mounted a chain wheel 42 from which passes an operating chain 43 through the floor E, the lower end of the chain passing over a grooved pulley 44 forming a part of or secured to, a lock-wheel 45 rigidly carried by or keyed to, the shaft 27. Bolted to a lug 46 of one of the yokes 25 is a bracket arm 47 terminating in a bearing 48 through which passes a cylindrical pin or spindle 49 for the support of the hub 50 of a bell-crank 51, the horizontal arm of which is pivotally coupled to the lower end of a vertical staff or rod 52 passed loosely through the floor E, the rod terminating above the floor in a pedal or platform 53, between which and the floor is interposed a compression spring 54. The free end of the vertical arm of the bell-crank 51 terminates in a finger 55 which is adapted to engage one of a series of peripheral notches $n$ formed in the lock-wheel, there being as many notches as there are cams disposed along either of the shafts 27, 27', that is to say there is one notch for every pair of cams 30 30' as distributed between the two cam-shafts.

It will be seen from Fig. 8, that the operator by placing his foot on the pedal 53 and depressing the staff 52 will trip the bell-crank 51 so as to cause the finger 55 to become disengaged from its notch $n$, allowing the operator to manipulate the chain 43 in such a way as to impart rotation in proper direction to the pulley 44 (and lock wheel 45) and consequently to the shaft 27, whereby both cam-shafts 27, 27', will be rotated in opposite directions. The degree of this rotation will depend on circumstances to be presently referred to, it being sufficient at this point to state that when the cam-shafts have been rotated through a sufficient arc, the operator releases the pedal 53, allowing the staff 52 to resume its normal position, whereupon the bell-crank 51 will be returned to its original position, the finger 55 engaging the particular notch $n$ opposite which it may happen to be, and thus locking the cam-shaft against further rotation. When the finger 55 locks the lock-wheel 45, only two cams (one cam on each shaft 27, 27') are in proper position to depress their levers 31, 31', to allow the corresponding pawls 18, 18' to engage their respective ratchets 16, 16'. This is obvious when we take the following into consideration: As shown diagrammatically in Fig. 11$^a$, the keys $k$ for securing the series of cams on the cam-shaft (27, 27') are disposed not along a common line parallel to the axis of the shafts, but circularly apart approximately fifty-two degrees, or one-seventh of a complete circle, it being understood that in the present embodiment of our invention there are seven cams distributed along the length of the shaft. The shafts being geared together as described (gears 39, 39$^a$), naturally rotate simultaneously in opposite directions, so that the cams 30 on the inner shaft (27) are set to point outwardly, whereas the corresponding cams 30' on the outer parallel shaft (27') are set to point inwardly (see for example Fig. 10 where the cams 30 and 30' point in opposite directions toward the space between the cam-shafts, the cam 30 being shown full, and cam 30' dotted) the cams being so set on the respective shafts that as the shaft 27 is rotated to cause a given cam 30 to depress its lever 31 to allow the latter to lower its pawl 18 into engagement with the gear 16 operating in conjunction with any given set of rockers 15, the shaft 27' will be rotated in proper direction to cause the corresponding cam 30' to depress its lever 31' to allow the latter to lower its pawl 18' into engagement with the gear 16' operating in conjunction with an adjacent set of rockers 15'. With these depressed positions of two levers 31, 31', and the engagement of the corresponding pawls 18, 18′, with their particular gears 16, 16′, the finger 55 of the bell crank 51 will be in locked engagement with one of the notches $n$ of the lock-wheel 45, none of the remaining cams of the cam-shafts having reached a point of their sweep to depress their levers 31, 31′, and hence none of the remaining pawls 18, 18′, being in engagement with their gears 16, 16′. It follows therefore that with a rotation of the drive shaft S, the reciprocations imparted thereby to the links 19, 19′, while imparting a rocking movement to all the sets of rockers 15, 15′, along the line, can impart periodic rotations or advances to only two of the rear wheels 16, 16′, identified with a given pair of grate rolls, the pawl 18 with each alternate stroke of the rockers 15 advancing its roll the distance of a tooth in one direction, whereas the pawl 18′ with each alternate stroke of the rockers 15′ will advance the opposite roll a distance of one tooth in the opposite direction, the rotations of the rolls being as indicated by the arrows in Fig. 4, that is to say the roll actuated by the pawl carried by the rockers 15 rotates clockwise and the roll actuated by the pawl carried by the rocker 15′ rotates or advances counter-clockwise, this being due of course to the manner in which the pawls are hung and the manner in which the ratchet gears are set on the rolls (see Fig. 12, 5,). To release any particular pair of rolls from their driving pawls, the operator trips the bell-crank 51 out of engagement with its notch $n$ (by depressing the pedal 53) whereby the camshaft is free to be turned to any other desired position to cause some other pair of cams to depress their levers 31 to bring about an engagement between their pawls and ratchet wheels, and thus set another pair of rolls into rotation, it being understood that the circumferential or circular disposition of the cams on their respective shafts is such that when a cam on one shaft acts to effect engagement between a pawl and its ratchet wheel, a corresponding cam acts similarly on the adjacent cam-shaft, so that a pair of rolls can always be advanced or rotated for crushing the clinkers and discharging the ashes. If the shaft 27 is turned so as to bring into engagement with the finger 55 the outer peripheral portion of the lock-wheel 45, that is to say the portion between two notches $n$, none of the cams will be operative because the arc of rotation is insufficient to bring about sufficient depression in any of the levers 31, 31′, to drop their pawls into positive engagement with thier ratchet wheels.

The number of notches $n$ in the wheel 45 corresponds of course with the number of cams on a cam shaft, or to the number of pairs of rolls supporting the fuel (there are seven pair of rolls in the present example), and while we here show seven pairs of rolls and seven cams, this number may be carried at will depending on the grate surface desired. Of course with a variation of the number of cams around the shaft, there would be a corresponding variation of the angle of separation between them. Thus, with six cams around the shaft, they would be separated circularly an angle of sixty degrees; with five cams around, they would be separated seventy-two degrees, and so on, requiring of course a corresponding spacing between the notches $n$ of the lock-wheel 45. Obviously, and were it desirable, it would be possible to dispose the several cams on a shaft in alinement (that is, along a line parallel to the axis of the shaft), and were this done all the pawls would be actuated at one and the same time so that all the pairs of rolls would rotate or operate simultaneously. Such an arrangement however is not ordinarily desired in practice, and the object of having but a single pair of rolls rotate at a time (the cams being disposed so that any pair of rolls of the series may be selected for turning) is to avoid imposing too great a strain on the rolls and prevent overloading, a result which might be attended with a breaking of the eccentric drive. So that the pawl-operating mechanism as shown is practically "fool-proof," for while all the pawls may be simultaneously disengaged (as above described) there is no possibility of more than two (one for each cam-shaft) being engaged at a time. Under the arrangement as shown (Figs. 4, 12), the terminal rolls of the series rotate simultaneously in the direction indicated by the arrows in Fig. 12, the material being discharged through the spaces between the rolls and the adjacent walls of the fire-box, but the remaining rolls operate in pairs as clearly apparent from said figure, the material discharging downward between the rolls of any pair and dropping onto a platform, beam or pair of platforms of beams 56 disposed parallel to the rolls and symmetrically about a central vertical plane through the opening between the rolls, the width of such beam or platform being sufficient to cause the ashes piling up on the same to completely seal the opening between the rolls. This width is determined by the angle of repose of the ashes, the width of the discharge opening between the rolls, and the distance of the beam below the rolls (Fig. 4). When the ashes are piled up at the angle or repose from the edge of the beam, the inclined surface of the pile should at least touch the roll as shown in Fig. 4. The width of the discharge opening between the rolls and the beam, must be reasonably large to avoid any unnecessary crushing of clinkers and lumps and to admit of the passage of any foreign substance too hard to crush. Thus the problem is solved as far as the discharge opening is concerned.

With regard to the alternate spaces between rolls where no discharge is supposed to take place, these can be made as small as possible, or just sufficient to let the rolls clear. This will prevent the fines as well as the coarse material, from running through. Or, if it is not practical to construct the rolls with a sufficiently small clearance, a filler could be put in consisting of a casting or plate, bent to suit the surface of the rolls. The beams 56 are supported by structural members 57 or their equivalents.

The operation of the mechanism is clear from the foregoing description but may be briefly summarized as follows: The motor M being started, rotation is imparted to the shaft S, and through the eccentrics 23, 23', keyed to said shaft and the eccentric rods 22, 22', leading therefrom reciprocating motions are imparted to the links 19, 19', simultaneously in opposite directions, the links in turn rocking their respective rockers 15, 15'. Through the swiveled yokes 25, 25', coupled to the rockers, horizontal reciprocations are necessarily imparted to the camshafts 27, 27', (the same of course reciprocating simultaneously in opposite directions, to permit which movement is the object of the loose connection between the gear 39' and the shaft 27'), the degree of such reciprocations depending of course on the distances the ratchets 16, 16', are to be advanced or rotated with each stroke. Of course in these reciprocations the lock-wheel 45 and bell-crank 51 are likewise reciprocated, but not to a sufficient degree to be materially affected or resisted by the staff 52 connected to the bell-crank, the length of the staff permitting sufficient flexure thereof to respond to the reciprocations of the parts referred to. When the operator desires to rotate any particular pair of rolls, he seizes the chain 43, depresses the pedal 53, trips the bell-crank 51, then turns the shaft 27 any number of degrees until the particular pair of cams 30, 30', have forced their corresponding pawls 18, 18', into engagement with their ratchet wheels 16, 16', the rolls identified with said wheels being periodically advanced or turned with the continuing reciprocations of the links 19, 19', or rocking of the members 15, 15'. The particular pair of rolls may be rotated as long as necessary, after which they may be disengaged and another pair or set of rolls pressed into service. Of course during the action of any pair of rolls, the finger 55 is kept in engagement with the lock-wheel 45 until said rolls are disengaged and another set of rolls started. To arrest rotation of the rolls, either the motor may be stopped, or the finger 55 set against the lock-wheel 45 between two notches, in which position none of the pawls will be in engagement with their ratchet wheels, and none of the rolls will turn. The rolls are kept cool by the current of water (or other medium) traversing the same in the manner already described. As the rolls rotate the clinkers are crushed to the necessary size to pass through the openings between the rolls, (or grate elements) the removal thereof and of the fines being effected without unduly disturbing the upper portions of the bed.

There are two important and essential features, or principles, in gas producer grating, to which this invention lends itself admirably:

(1) In all previous grating devices in which the ashes and clinkers are discharged through openings distributed over the entire area of the grate, the grates in reality act more or less as a screen, or shaking screen, if the grate is of the shaking variety. That is, the fine ashes are sifted out almost completely, or to a much greater extent than the clinkers or large pieces. This opens up the ash bed, reducing the resistance to the draft. Now this is a necessary feature in direct firing where natural draft is used; but in gas producers where forced draft is employed, it is not only of no importance to have the ash bed opened up in this way, but it is a decided and serious disadvantage, as will be shown: In the first place, if the grating mechanism is so designed that the fines and clinkers can be discharged together without any screening out, or separation, the result will be that, the fines being all retained with the clinkers and other larger pieces, the bed of ashes will have a uniform density all over and for the entire depth. The density of the ash bed will be considerably increased, and will be greater than that of the combustion zone above, providing of course the fuel used is not too fine. There will be no weak or open places in the ash bed where an excess of draft can get through and cause blow-holes, which cause clinkering and also the escape of unburned air into the upper chamber of the producer. If there are weak places in the combustion zone, on account of the density of the ash bed below, the excess air that can blow through at these weak places will not be very great. In other words, the dense ash bed, (which density is due to the fines being retained with the coarse), acts as the best kind of a distributer for the air, and minimizes the effects of weak places in the combustion zone. Of course, greater pressure is required to force the air through this dense bed, but with forced draft the small extra pressure is of little consequence.

(2) The other feature, or principle, which hinges on the dense ash bed, is one that depends for its operation upon the fact of the ash bed being denser than the combustion zone; and this feature consists of the automatic regulation of the combustion, or equalizing of the combustion over the entire area. It is presumed that the surface of the bed will be kept practically level, or nearly so. To begin with, assuming that conditions are normal and uniform in the bed; that is, that the ash bed is of uniform thickness and the zone of combustion also; then if for any reason any inequality in the air pressure develops in the ash pit, it will, of course, cause an excess of air to go through that portion of the bed, just above. This will increase the rate of combustion of that part of the bed over the remainder, and, of course, this high pressure part of the bed, burning faster, will sink faster and more coal will have to be supplied at that part to maintain the uniform level of the surface. Also, regarding the discharge of ashes through the grates, this can be varied at different parts of the bed only within certain limits, so that for the purpose of this illustration, let it be presumed that the ashes can be discharged only at a uniform rate over the entire bed. Then, as more coal is being burned at one portion of the bed than another, more ashes are being formed at one place than at another, and as the rate of discharge of ashes is uniform, there must consequently be a greater building up of ashes at that portion of the bed where the air pressure in the ash pit is the higher. Or, in other words, the line between the combustion zone and ash bed must rise higher, thus making the depth of the ash bed greater where the under-grate air pressure is greater. But, as the surface of the bed is kept level, thus making the total thickness of the entire bed equal all over, (assuming the grates are horizontal) and as the ash zone is denser, or more resistent to the passage of air than the combustion zone, it is obvious that the portion of the bed which has the greater proportionate depth of ash zone must offer the greater resistance to the passage of the air. But this is the portion of the bed which has the greater undergrate air pressure, as was shown, therefore, the resistance of the bed at any point tends to increase with the air pressure underneath at that point, and this tends to bring about an equalization of the rate of air pressure through the bed all over, and hence equalization of rate of combustion over the entire area. Hence, after this equilibrium has been established, there can always be maintained a combustion zone wherein good gas can be produced over the entire area, and only completely burned ashes discharged from all parts of the grating area. If it were not for this tendency to equalize the rate of combustion, due to the ash zone being denser than the combustion zone, there would practically always be portions of the area of the bed where the ashes would extend practically up to the surface, thus allowing unburned air to get through; or at least where the combustion zone would be so thin that instead of producing gas the coal would be completely burned by the primary air. And, there would be other portions of the area of the bed where partially burned coal would be discharging through the grates. Of course, if the grating mechanism were such that the ashes could, at any time, be discharged at will from any portion of the grates desired, without discharging an equal amount from the rest of the grate area, then the inequal condition of the ash and combustion zones would be corrected mechanically.

The principles of the gas producer operations described, depend, as intimated in the beginning, upon the fine and coarse parts of the ashes all being discharged together, or in other words, upon the feature of the fines being retained in the ash zone instead of being sifted out, or screened out, leaving the clinkers. This feature of the operation is accomplished by the rolls rotating as described, substantially all the discharge taking place between those pairs of rolls whose adjacent peripheral portions are moving downward (Fig. 4). It would of course hardly be practical to place the rolls so close together that the fines could not sift through ahead of the coarser particles of the ashes, and to prevent this sifting is the object of the beam or platform 56, the width of which as previously stated should be such as to permit the ashes piling up on it, to completely seal the discharge opening between the rolls.

Figure 13:
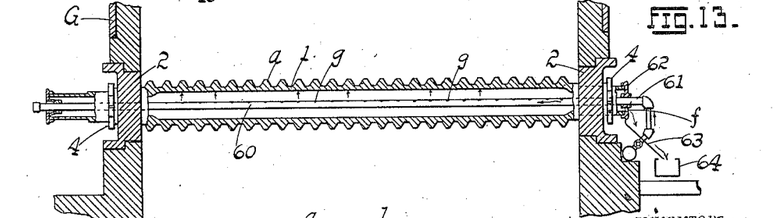
Fig. 13 is a sectional illustration showing a modified method of cooling a hollow grate roll.
Figure 14:
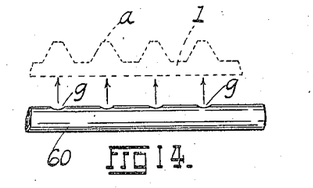
Fig. 14 is an enlarged detail showing the cooling means illustrated in Fig. 13.
Figure 15:
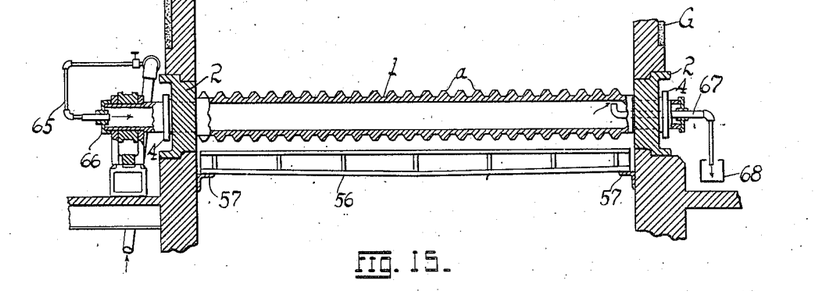
Fig. 15 is a sectional illustration showing a further modification of a method for cooling a hollow grate-roll or cylinder.

As previously pointed out, the mechanism is susceptible of many modifications, some of which have already been alluded to. In the preferred method of cooling the rolls (where hollow rolls are used) we illustrate a circulating pipe which has a terminal discharge within the roll. In Figs. 13 and 14 we show a modification in which the circulating pipe 60 is provided with peripheral discharge openings $g$ causing the cooling water to impinge against the inner walls of the roll. The supply branch 61 thereof passes through a stuffing-box 62 of the trunnion of the grate roll, which box is provided with a discharge opening $f$ from which the water is discharged over an inclined plate 63 into a launder 64. In Fig. 15 we show a water supply pipe 65 discharging through the terminal cap-piece or plate 66 directly into the hollow roll 1, whence it discharges from a pipe 67 into a launder 68 as clearly apparent from the drawing.

Features shown but not alluded to are well understood in the art and require no description in the present connection. In view of the many modifications of which the present mechanism is susceptible, it is obvious that we do not limit ourselves to the form of mechanism here shown. For example, the grate rolls forming the fuel supporting surface or grate area, are here shown parallel, and disposed in a horizontal plane; but it is obvious that they may be disposed radially or otherwise and on inclined planes. The specific spring control for the bell-crank lever 31 (31′) here shown and which is itself well known may be changed, without departing from the nature of the invention with which said control is associated. The manner of driving the rolls may be varied at pleasure. In lieu of an electric motor M as shown, we may substitute a steam, air, or gas motor, or the rolls might be turned by hand. In fact the entire design might be altered without a departure from the spirit or nature of our invention.

Having described our invention, what we claim is:

1. In a grate mechanism, a series of grate rolls collectively forming a fuel-supporting surface and disposed in pairs and spaced apart, a motor, and intermediate connections between the motor and rolls for singling out any pair of rolls and imparting simultaneous rotation to the individual members thereof in opposite directions.

2. In a grate mechanism, a series of grate rolls collectively forming a fuel-supporting surface and disposed in pairs and spaced apart, a motor, pawl and ratchet mechanism for actuating the several rolls, and intermediate means interposed between the motor and rolls for selectively operating the actuating mechanism of a predetermined pair of rolls and imparting rotation to the members thereof.

3. In a grate mechanism, a series of grate-rolls collectively forming a fuel-supporting surface and disposed in pairs and spaced apart, trunnions for said rolls, rockers mounted loosely on the trunnions, ratchet wheels on the trunnions adjacent the rockers, a motor, intermediate mechanism between the motor and rockers for rocking the latter, pawls on the rockers normally disengaged from the ratchet-wheels, and means on the rockers under the control of the operator for effecting engagement between the ratchet wheels of a predetermined pair of rolls, and their pawls, whereby rotation is imparted to said pair of rolls.

4. In a grate mechanism, a series of grate-rolls collectively forming a fuel-supporting surface and disposed in pairs and spaced apart, trunnions for said rolls, rockers mounted loosely on the trunnions, a motor, means interposed between the motor and rockers for oscillating the rockers of the rolls of any pair simultaneously in opposite directions, ratchet wheels on the trunnions positioned in proximity to the rockers, pawls on the rockers normally disengaged from the ratchets, and means on the rockers under the control of the operator for causing an engagement of the pawls with the ratchets of any predetermined pair of rolls, whereby simultaneous periodic advances in opposite direction are imparted to the ratchets of the respective members of any pair of rolls and to the rolls.

5. In a grate mechanism, a series of grate-rolls spaced apart and disposed in pairs and collectively forming a fuel-supporting surface, trunnions for the rolls, rockers mounted loosely on the trunnions, a motor, independent links connecting adjacent ends of alternate rockers, intermediate connections between the links and motor for imparting simultaneous reciprocations in opposite directions to the links, and corresponding oscillations to the rockers, ratchet disks secured to the trunnions, adjacent the rockers, the teeth of the ratchet on one member of a pair of trunnions extending in a direction opposite to the teeth of the ratchet on the coacting member, means on the rockers under the control of the operator for effecting engagement between the ratchets of any predetermined pair of rolls and their pawls, whereby the members of such pair of rolls have imparted thereto a simultaneous periodic rotary advance in opposite directions.

6. In a grate mechanism, a pair of rolls spaced apart, trunnions for the rolls, rockers mounted loosely on the trunnions at adjacent ends of the rolls, a reciprocating link attached to each rocker, the links imparting simultaneous oscillations to the rockers in opposite directions, a ratchet disk on each trunnion adjacent the rocker, a pawl on each rocker coöperating with the ratchet, rotatable shafts coupled to the respective rockers, gears on the shafts intermeshed and interlocked with one another, one of the gears being slidably feathered to its shaft, and means interposed between the shafts and pawls for effecting engagement between the ratchets and their pawls upon rotation of the shafts through a given arc.

7. In a grate mechanism, a series of grate rolls disposed in pairs and spaced apart, the rolls having cylindrical terminals or trunnions, rockers mounted loosely on the rolls, links at adjacent ends of the rolls, links pivotally coupled to the rockers of corresponding members of the several pairs of rolls, means for imparting simultaneous reciprocations in opposite directions to the respective links and corresponding oscillations to the rockers to which the links are coupled, ratchet wheels secured to the trunnions adjacent the rockers, pawls on the rockers in coöperative relation to the ratchets, a shaft extending along each set of rockers and coupled thereto by swiveled connections disposed along the shaft, gears on the shafts meshing with one another, the gear on one shaft being rigid, and the gear on the opposite shaft being feathered to said shaft, means for interlocking the gears against longitudinal displacement, cams on each shaft corresponding in number to the number of pawls identified with each set of rockers, and means interposed between the pawls and cams for effecting engagement between the ratchets of any pair of rolls with a rotation of the cam-shafts through a given arc.

8. In a grate mechanism, a pair of rolls spaced apart, trunnions for the rolls, rockers mounted loosely on the trunnions at adjacent ends of the rolls, means for imparting simultaneous oscillations to the rockers in opposite directions, a ratchet disk on each trunnion adjacent the rocker, a pawl on each rocker adapted to engage the ratchet, rotatable shafts coupled to the respective rockers, gearing coupling the shafts, means interposed between the shafts and pawls for effecting engagement between the ratchets and their respective pawls with a rotation of the shafts through a given arc whereby the rolls are periodically and simultaneously advanced rotatively, and means for disengaging the pawls from the ratchets upon a rotation of the shafts beyond the arc aforesaid.

9. In a grate mechanism, a series of grate rolls disposed in pairs and spaced apart, and terminating in cylindrical trunnions, rockers disposed in pairs at adjacent ends of the rolls and free to oscillate about the axes of the trunnions, the rockers extending above and below said axes, each alternate pair being the longer and extending below the rockers of adjacent rolls, links pivotally connecting the successive short and long series of rockers, the link coupling the shorter rockers passing between the longer arms of alternate rockers, a drive-shaft, eccentrics on the shaft, set angularly apart, eccentric rods connecting the eccentrics to the links for imparting to the respective links reciprocations simultaneously in opposite directions, ratchet wheels on the trunnions between the members of each pair of rockers, the teeth of the successive ratchets extending in opposite directions, pawls mounted between the rocker members above the series of ratchets, yokes swiveled to the successive pairs of rockers in the general plane of oscillation of the rockers, parallel shafts mounted on the yokes, the latter being provided with openings above the ratchets, cams on the shafts disposed over the openings and set angularly apart along the shafts, a distance in degrees determined by dividing three hundred and sixty by the numbers of pairs of rolls to be actuated, the cams of the respective shafts extending in opposite directions, spring-controlled levers mounted to oscillate between the rocker members above the pawls, humps on said levers disposed in the paths of rotation of the cams, chains or equivalent means for connecting the levers to the pawls, gearing between the cam-shafts, interlocking means between the gears to prevent longitudinal displacement thereof along the shafts, the gear of one of the cam-shafts being slidingly feathered thereto, and means for imparting rotation to the cam-shafts for causing a depression of two of the pawls by the cams of the respective shafts operating through the levers aforesaid, whereby simultaneous periodic rotary advances are imparted to the members of one pair of rolls, said pair depending on the arc through which the cam-shafts are actuated.

10. In a grate mechanism of the character described, a series of pairs of grate rolls, ratchets on said rolls, pawls for imparting periodic advances to the ratchets of any pair of rolls, a cam-shaft operating selectively upon the several pawls of any set of ratchets whereby an engagement between any pawl and its ratchet may be effected by a rotation of the cam shaft through a prescribed arc, a lock-wheel on the cam-shaft, and a spring-controlled member for engaging the lock-wheel and locking the same against rotation during the period of engagement between the pawl and its ratchet.

11. In a grate mechanism of the character described, suitable grate rolls, ratchet wheels on the rolls, pawls for actuating the ratchets, a cam-shaft having a series of cams distributed along the same and set angularly apart around the periphery of the shaft, and means actuated by the cams for controlling the pawls.

12. In a grate mechanism of the character described, suitable grate rolls, ratchet wheels on the rolls, pawls for advancing the ratchets and their rolls, and a cam-shaft having a series of cams distributed along the same and set angularly apart around the periphery of the shaft, said cams operating to control the pawls aforesaid.

13. In a grate mechanism, a series of grate rolls collectively forming a fuel-supporting surface and disposed in pairs, means for actuating the rolls, and means controllable independently of the actuating means for singling out any pair of rolls, whereby rotation may be imparted to said pair.

14. In a grate mechanism, a series of grate rolls collectively forming a fuel supporting surface and disposed in pairs, means for actuating the rolls, and intermediate mechanism between said actuating means and rolls for singling out any pair of rolls and imparting rotation thereto.

In testimony whereof we affix our signatures in presence of two witnesses.

JAMES A. BOW.
   PETER THILL.
   ARCHER E. WHEELER.

Witnesses for James A. Bow and Peter Thill:
 Roy A. La Motte,
 Robert Grig.

Witnesses for Archer E. Wheeler:
 Frederick W. Snow,
 James E. Kidd.